United States Patent
Beatham et al.

(10) Patent No.: US 11,840,997 B2
(45) Date of Patent: Dec. 12, 2023

(54) ENGINE PERFORMANCE INDICATOR (71) Applicant: Ford Global Technologies, LLC, Dearborn, MI (US)

(72) Inventors: Eric R. Beatham, Livonia, MI (US); Joseph Pisani, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 17/184,439

(22) Filed: Feb. 24, 2021

(65) Prior Publication Data
US 2022/0268250 A1    Aug. 25, 2022

(51) Int. Cl.
*F02P 5/152* (2006.01)
*B60Q 9/00* (2006.01)
*B60K 35/00* (2006.01)

(52) U.S. Cl.
CPC .............. *F02P 5/152* (2013.01); *B60K 35/00* (2013.01); *B60Q 9/00* (2013.01); *B60K 2370/167* (2019.05)

(58) Field of Classification Search
CPC ..... F02P 5/152; B60Q 9/00; B60K 2370/152; B60K 2370/167; F02B 77/085; F02B 77/087; F02D 35/027; G01M 15/11
See application file for complete search history.

(56) References Cited

U.S. PATENT DOCUMENTS

| | | | |
|---|---|---|---|
| 2,696,552 A * | 12/1954 | Wood | F21V 9/08 340/815.49 |
| 5,063,902 A * | 11/1991 | Inoue | F02P 5/1455 123/406.41 |
| 5,581,016 A * | 12/1996 | Gonzalez | G01L 23/225 73/35.06 |
| 6,947,830 B1 * | 9/2005 | Froloff | F02D 41/3076 701/111 |
| 7,370,634 B2 | 5/2008 | Christman et al. | |
| 2009/0078027 A1 | 5/2009 | Morris et al. | |
| 2019/0211796 A1 * | 7/2019 | Dudar | F02P 5/1526 |

FOREIGN PATENT DOCUMENTS

| | | | | |
|---|---|---|---|---|
| CN | 1691098 A | | 11/2005 | |
| EP | 2330289 A1 * | | 6/2011 | ............ F02B 19/108 |
| JP | 5222999 A * | | 8/1993 | |
| WO | 2008053409 A1 | | 5/2008 | |
| WO | 2017089861 A1 | | 6/2017 | |

* cited by examiner

*Primary Examiner* — Logan M Kraft
*Assistant Examiner* — Joshua Campbell
(74) *Attorney, Agent, or Firm* — Vincent Mastrogiacomo; McCoy Russell LLP (57) ABSTRACT

Methods and systems are provided for a visual indicator of engine performance. In one example, a method may include generating an adaptive knock control parameter and adjusting a display to an operator. The display may be adjusted based on the adaptive knock control parameter and may allow the operator to be notified of changes in available engine power.

20 Claims, 6 Drawing Sheets

ENGINE PERFORMANCE INDICATOR

FIELD

The present description relates generally to methods and systems for providing an indicator of engine performance to an operator.

BACKGROUND/SUMMARY

Engine performance is dependent on an amount of torque generated at combustion chambers of the engine. Peak power is provided when combustion, facilitated by spark ignition, generates a maximum cylinder pressure just after top dead center (TDC) of a cylinder piston. In some examples, advancing spark timing provides additional time for an air/fuel mixture in the cylinder to fully ignite, thus increasing power derived from expansion of the combusted mixture. However, a vehicle may be refueled with fuels of varying anti-knock index (AKI) ratings. When combusting gasoline with, for example, a low octane rating, the low octane gasoline may burn faster and at a higher temperature than gasoline with a high octane rating, increasing a likelihood of cylinder knock which may lead to degradation of cylinder components.

In order to mitigate knock, an adaptive knock control may be implemented in the vehicle. The adaptive knock control may include delaying spark timing by small increments when knock is detected, until knock ceases. Following knock mitigation, the spark timing may then be advanced, also in small increments, to determine an optimal ignition timing which is used to update and reset an ignition memory map.

Although such an adaptive learning strategy is beneficial for prolonging engine life and accommodating changes in combustion as the cylinder ages, an operator may not be alerted to adjustments to spark timing provided by the adaptive knock control. Thus, a reduction in power output during delayed spark timing events may cause frustration, particularly when the vehicle is utilized for applications demanding high torque output, such as towing. For example, the operator may not be able to determine if the reduced engine performance is a result of variation in ambient conditions, e.g., ambient temperature and/or humidity, environmental conditions, such as slick terrain causing tire slippage, or a result of selective torque reduction commanded based on the adaptive knock control.

In one example, the issues described above may be addressed by a method for generating an adaptive knock control parameter and adjusting a display to an operator in response to the adaptive knock control parameter to indicate an available engine power. In this way, an operator may be notified when peak engine power is available.

As one example, a spark timing at combustion chambers of an engine may be retarded or advanced in response to output from one or more knock sensors. The adaptive knock control parameter may vary between −1 and 1 based on changes in spark timing, reflecting an amount of generated torque. The amount of available torque may be indicated by adjusting an intensity of the display. Thus the operator may be notified of engine performance in real-time, enabling opportunistic execution of engine operations demanding high torque output.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 is shown approximately to scale.

DETAILED DESCRIPTION

Figure 1:
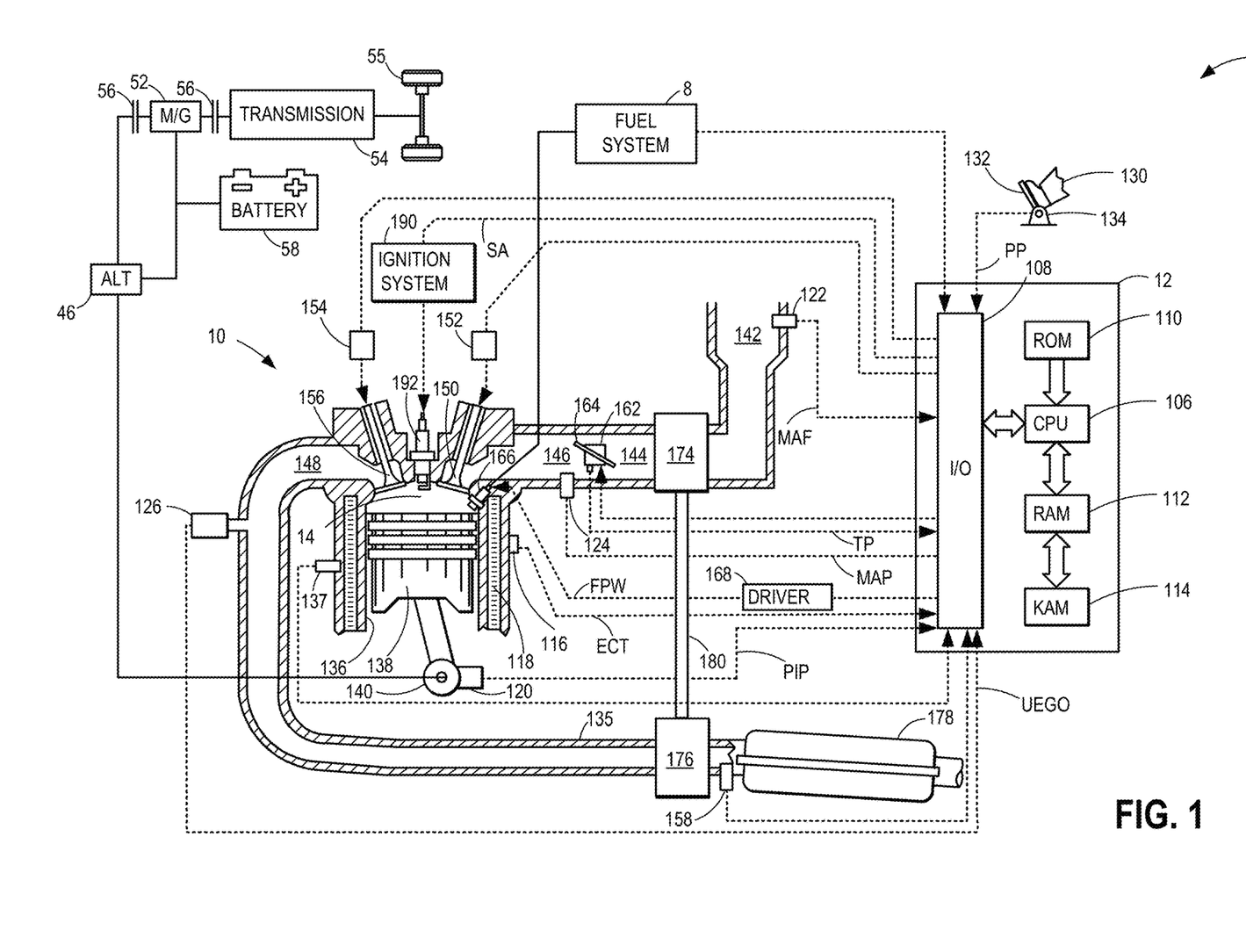
FIG. 1 shows an example of an engine system including a combustion chamber at which knock may be monitored.
Figure 3:
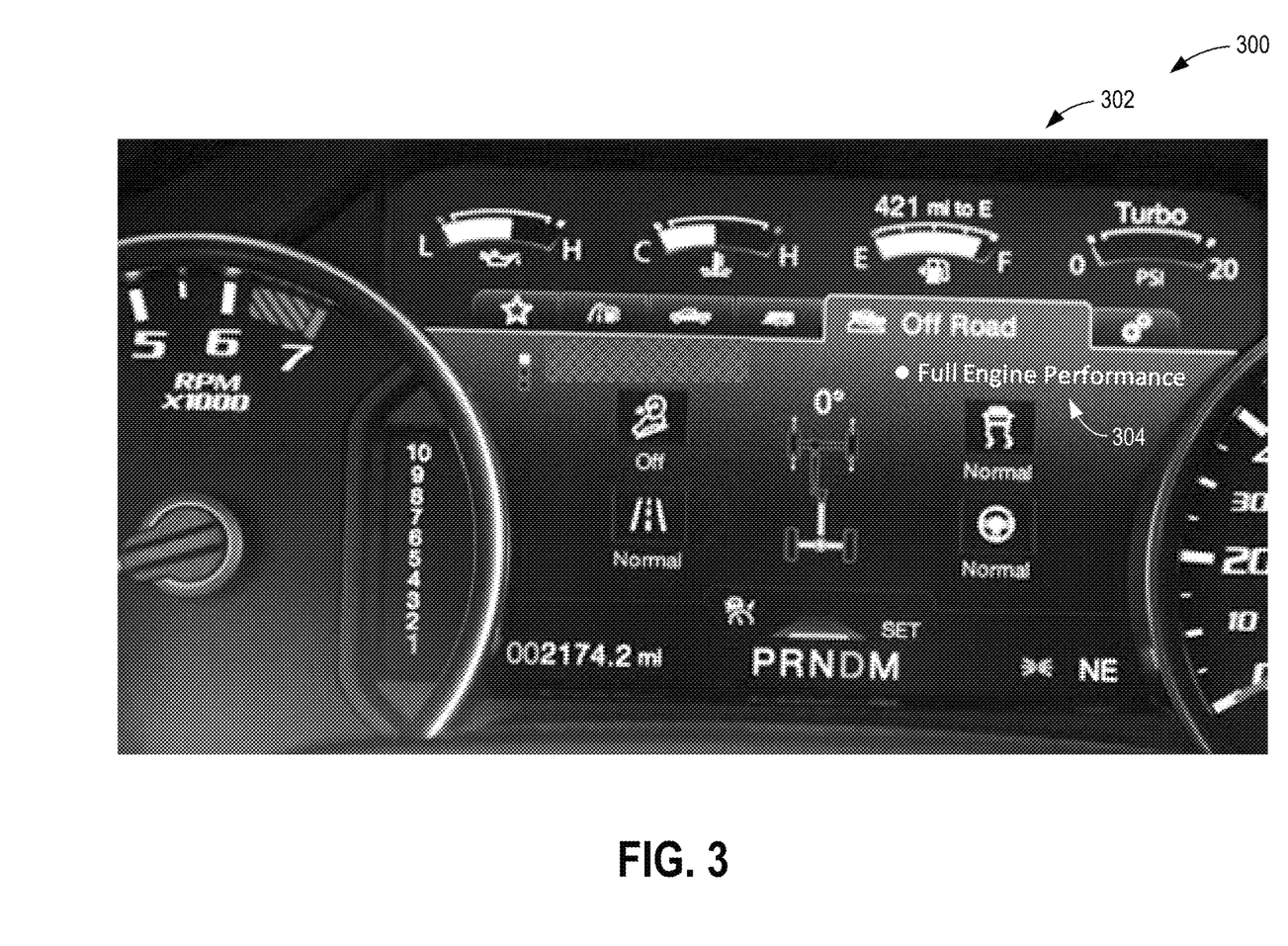
FIG. 3 shows an example of a human-machine interface (HMI) at which the PIL may be displayed.
Figure 4:
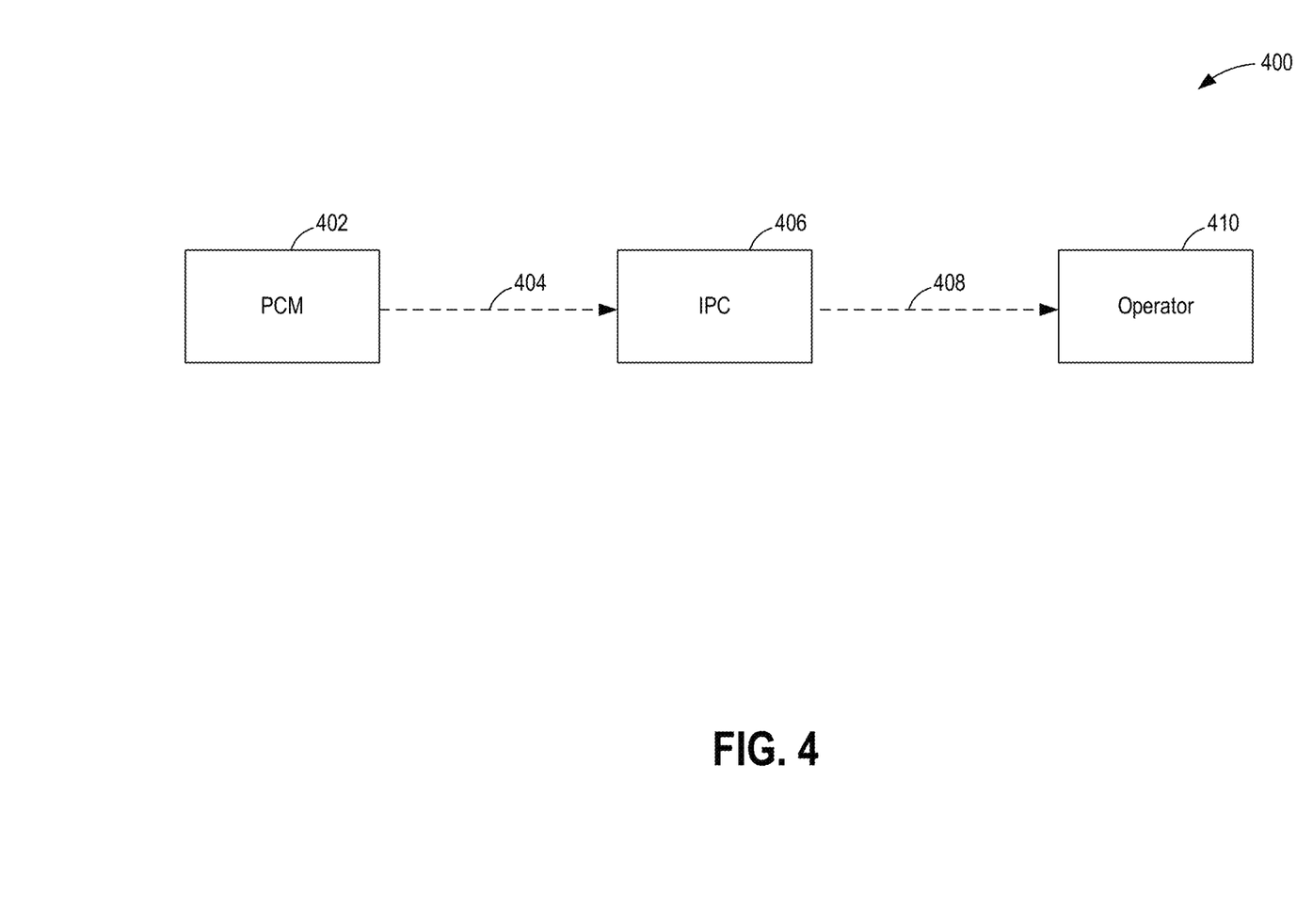
FIG. 4 shows an example of a communication architecture for displaying the PIL.
Figure 5:
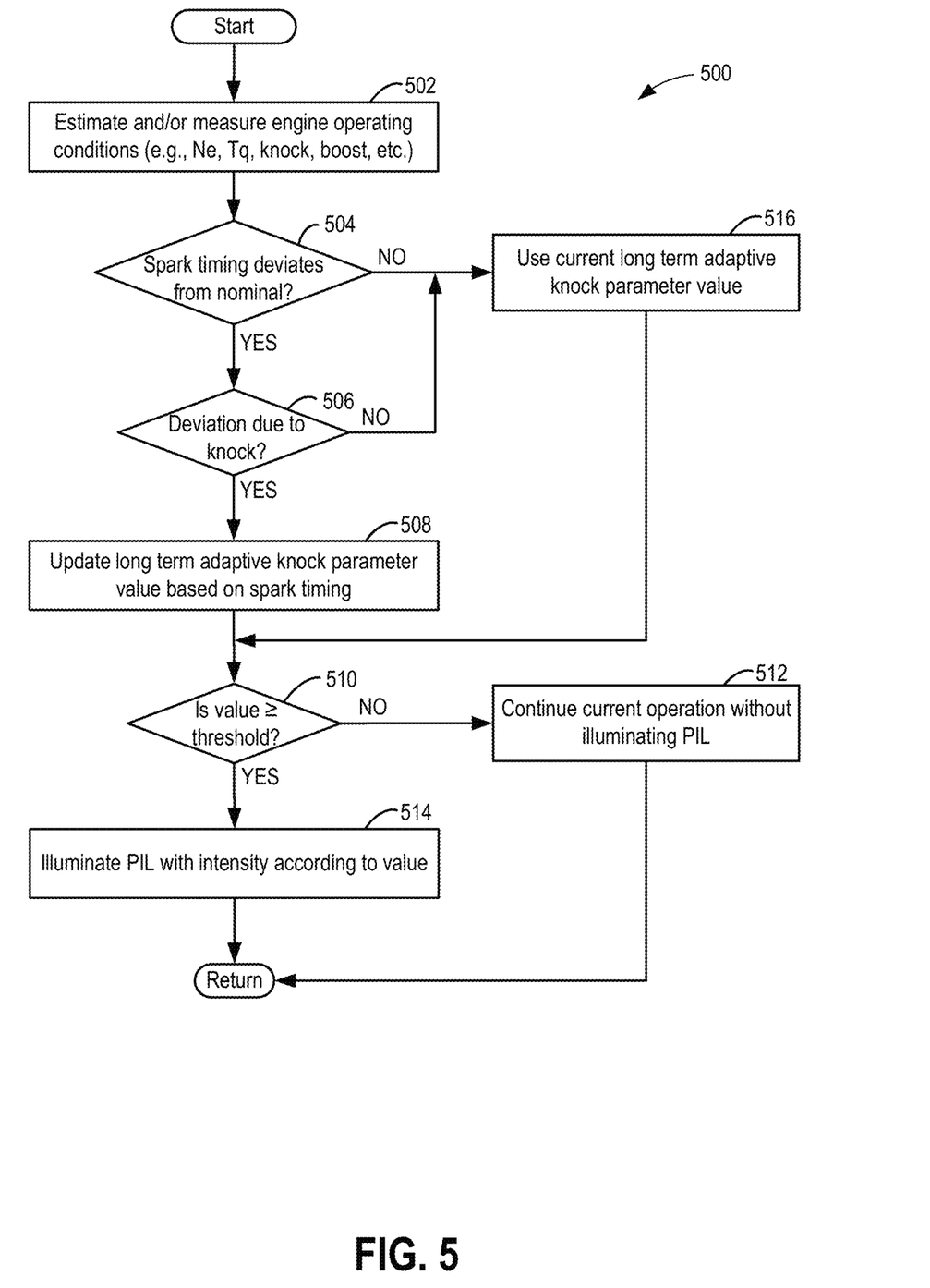
FIG. 5 shows an example of a routine for activating the PIL in a vehicle configured with adaptive knock control.
Figure 6:
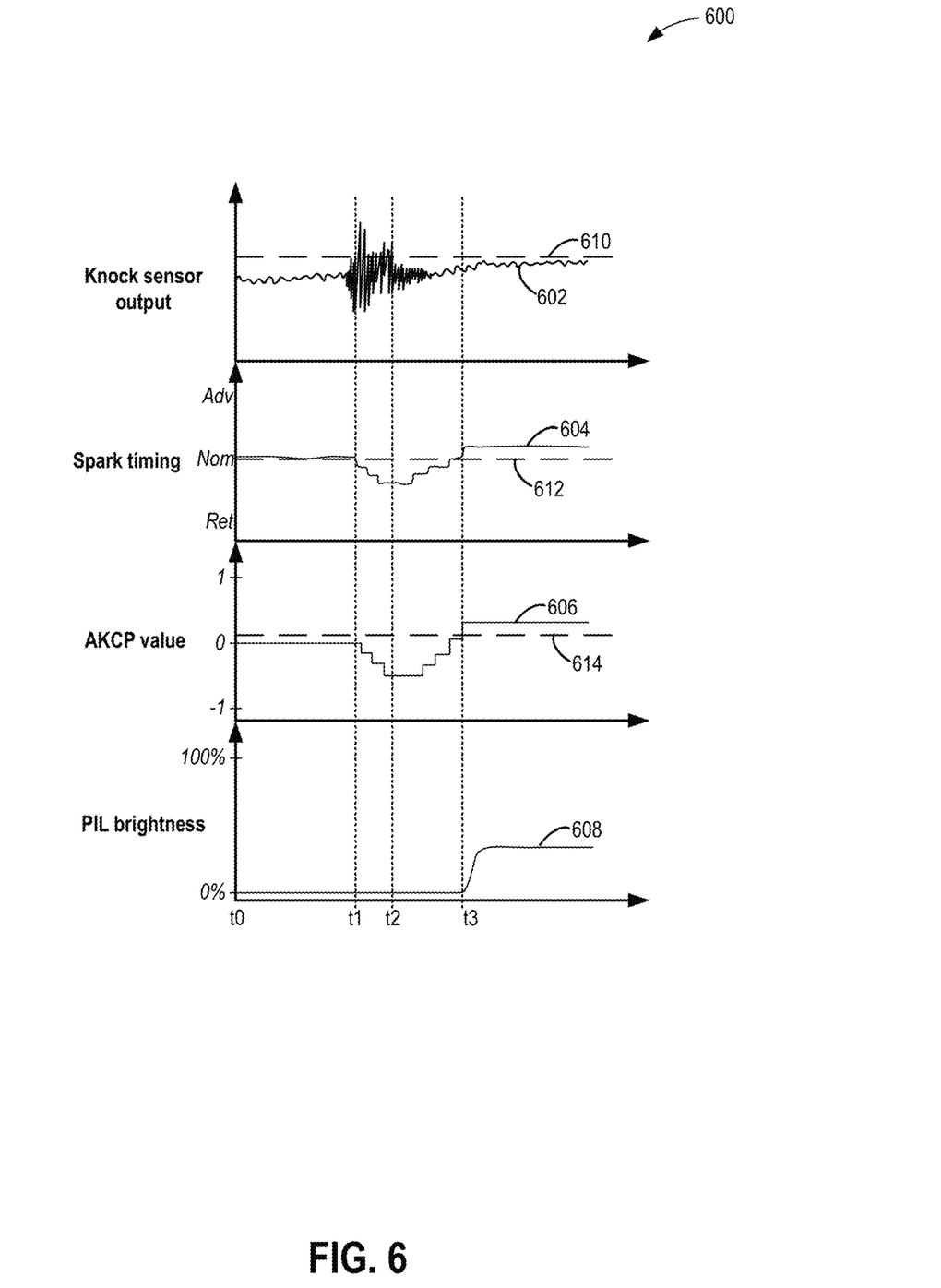
FIG. 6 shows example operations and parameters in the vehicle adapted with the PIL.

The following description relates to systems and methods for providing an indication of current engine performance to an operator. Engine performance is affected by combustion at the engine cylinders and an ignition timing at the cylinders may be adjusted based on detection of knock. An example of an engine, including a cylinder, is depicted in FIG. 1. In some examples, knock at the cylinders may be monitored via adaptive knock control which may cause spark timing to be delayed when knock is detected. When the spark timing is delayed, a torque output of the engine is reduced, which may cause driver frustration when the engine is operated during applications with high torque demand. By implementing a performance indicator lamp (PIL) which is illuminated based on engine performance, the driver may be notified of an available engine power status. The PIL may be inferred based on a long term adaptive knock parameter determined by the adaptive knock control, as shown in a graph in FIG. 2. By displaying the PIL at a human-machine interface (HMI) at a dashboard of a vehicle, as illustrated in FIG. 3, the driver may readily observe illumination of the PIL. A flow of communication from a powertrain control module (PCM) to the driver to notify the driver of the engine status is shown in FIG. 4. An example of a routine for activating the PIL based on spark timing, as regulated by the adaptive knock control, is depicted in FIG. 5 and variations in engine operations and engine parameters occurring during monitoring of cylinder knock is shown in FIG. 6.

Turning to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutch 56 is engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems, including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based on system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from the engine, and exhaust turbine 176 may be optionally omitted. In still other examples, engine 10 may be provided with an electric supercharger (e.g., an "eBooster"), and compressor 174 may be driven by an electric motor.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, the compression ratio may be increased when different fuels are used. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed and engine load, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and may be further configured to inject this fuel mixture directly into cylinder 14. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Engine 10 may further include one or more knock sensors coupled to each cylinder 14 for identifying abnormal cylinder combustion events, such as knock sensor 137 shown in FIG. 1. In other examples, one or more knock sensors may be coupled to selected locations of the engine block. In some examples, knock sensor 137 may be an accelerometer coupled to the cylinder block. In another example, knock sensor 137 may be an ionization sensor configured in the spark plug of each cylinder. The output of knock sensor 137 may be used to indicate an abnormal combustion event in cylinder 14 and the rest of the cylinders included in engine 10. In one example, based on the output of knock sensor 137 in one or more defined windows (e.g., crank angle timing windows), abnormal combustion due to one or more of knock and pre-ignition may be identified and differentiated. For example, knock may be identified responsive to knock sensor output obtained in a knock window being higher than a knock threshold, while pre-ignition may be identified responsive to knock sensor output obtained in a pre-ignition window being higher than a pre-ignition threshold. The pre-ignition threshold may be higher than the knock threshold, and the pre-ignition window may be earlier than the knock window, for example. In some examples, the knock sensor output may be combined with the output of a crankshaft acceleration sensor to identify one or more of knock and pre-ignition.

In one example, the knock sensor 137 may be used to detect knock for adaptive knock control implemented at controller 12. An ignition memory map, correlating spark timing to engine speed and/or load, for example, may be continuously updated when knock is detected at one or more of the cylinders 14. The adaptive knock control may include incrementally delaying spark timing at the affected cylinder(s) until knock ceases. Spark timing may then be incrementally advanced to determine an optimum timing for the cylinder(s). The new timing may be used to reset the ignition memory map which may be used in subsequent ignition events at the same engine speed/and or load. In this way, ignition timing may be adjusted to compensate for changes to combustion resulting from, for example, aging of the cylinder 14 or modifications to other engine components.

Controller 12, which may include a powertrain control module (PCM), is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; a throttle position signal (TP) from a throttle position sensor; signal UEGO from exhaust gas sensor 126, which may be used by controller 12 to determine the AFR of the exhaust gas; a knock signal from knock sensor 137; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1, processes the received signals, and employs the various actuators of FIG. 1 (e.g., fuel injector 166 and spark plug 192) to adjust engine operation based on the received signals and instructions stored on a memory of the controller. For example, the controller may receive an indication of knock from knock sensor 137 and proceed to apply the adaptive knock control to gradually retard spark timing at the cylinder until knock is no longer detected.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

As described above, a vehicle may be configured with adaptive knock control to monitor and adjust spark timing in response to detection of knock at one or more cylinders. As an example, the cylinders may be more prone to knock when the vehicle is refueled with a lower octane fuel than a previously combusted fuel. Adaptive knock control may enable stable combustion in spite of usage of fuels with varying AKI ratings. While retarded spark timing may effectively mitigate knock, the adjusted spark timing may result in reduced engine torque output. A loss of engine power may be apparent when the engine is operated in a mode imposing a heavy torque demand. For example, the vehicle may be coupled to a tow load and adjusted to an automatic tow mode. Increased torque may be requested but not met due to concurrent knock mitigation. However, an operator may be unaware of spark delay, as executed based on the adaptive knock control to mitigate cylinder knock, and may be confused or frustrated due to an unexpected loss of engine power. Differentiating between lack of torque resulting from adaptive knock control or resulting from other variables, e.g., ambient conditions, loss of traction, etc., may be difficult to distinguish.

In one example, a real-time visual indication of engine performance may be provided in response to a spark timing adjustments facilitated by the adaptive knock control. The visual indication may be graded based on an adaptive knock control parameter. In one example, the adaptive knock control parameter may be a long term adaptive knock control parameter, where the long term adaptive knock control parameter enables efficient stabilization out of knocking events versus a short term adaptive knock control parameter that allows for engine operation near a knock limit to maximize engine performance. A value between −1 and 1 for a long term knock adaptation parameter may be determined based on a change in spark timing. For example, an amount of deviation from a nominal spark timing, e.g., a conservative spark timing at which knock is unlikely to occur, may be determined during tip-out events and a short-term feedback signal may be integrated into the long-term knock adaptation parameter when entry conditions are met. Engine load limits and borderline spark (e.g., a spark timing at which borderline knock is detected) may be modified in response to generation of the value. If the value is greater than 0, an engine load limit may be increased and spark may be advanced. Conversely, if the value is less than 0, the engine load limit may be decreased and spark may be delayed. As such, values greater than 0 enhance engine performance and values less than 0 reduce engine performance.

It will be noted that the PIL and method for activating the PIL described herein is suitable for spark ignition engine systems with external exhaust gas recirculation (EGR). In engine systems where external EGR is implemented, variable cam timing overlap may lower a peak combustion temperature. As a result, borderline spark advance may modified based one EGR percent. For example, one degree of spark advance may be allowed per % EGR (where % EGR=100*[EGR mass/Air mass+EGR mass)]). However, the method for PIL activation may preclude knock adaptation in EGR regions.

The visual indication of engine performance, displayed in response to determination of the long term knock adaptation parameter value, may be a graded display presented at a visible location in the vehicle, such as at an HMI. In one example, the visual indication may be an indicator lamp, e.g., a PIL, illuminated at the HMI. An intensity of the illumination may be varied according to inferred engine performance.

Figure 2:
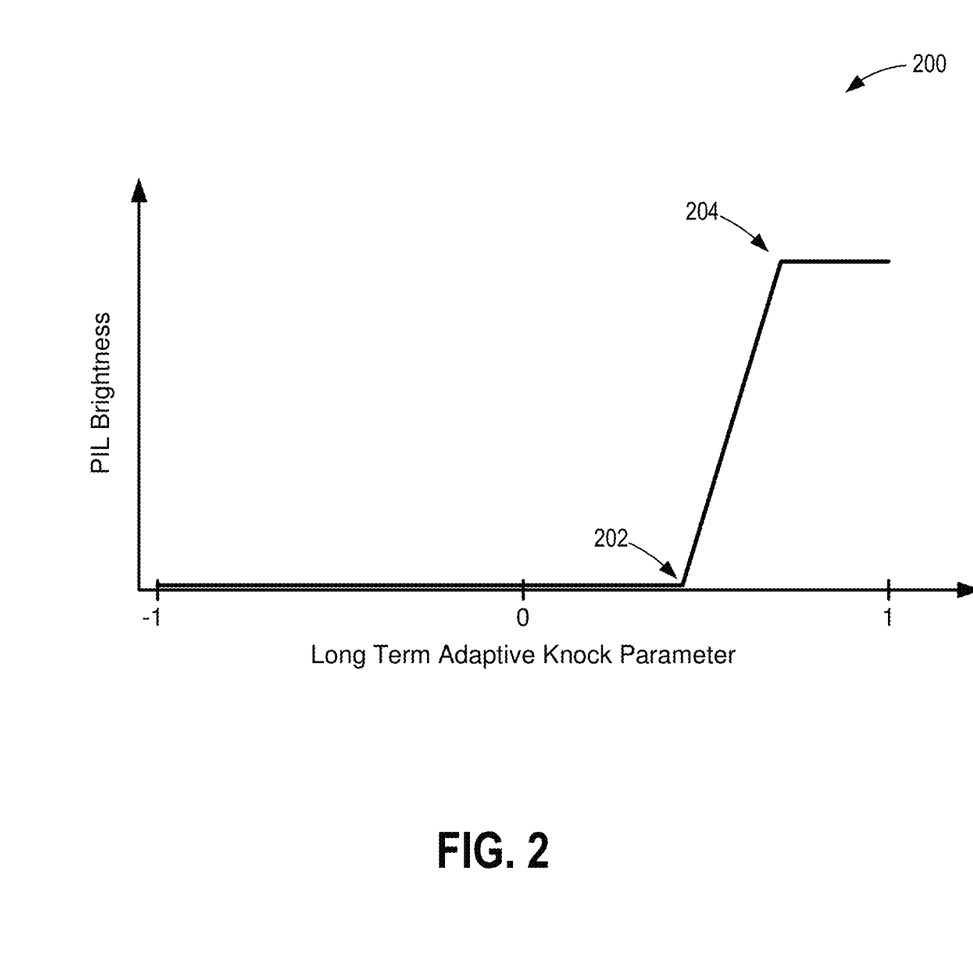
FIG. 2 shows an example of a graph depicting a relationship between a brightness of a performance indicator lamp (PIL) and a long term adaptive knock parameter.

For example, graph 200 depicted in FIG. 2 is a plot of PIL brightness relative to a long term adaptive knock parameter. The PIL is not illuminated when the long term adaptive knock parameter is less than 0. Illumination of the PIL is activated when a large increase in engine performance is detected, such as at a first value 202 between 0 and 1. Illumination intensity may reach a maximum intensity at a second value 204 which is greater than the first value 202 and less than or equal to 1. As the long term adaptive knock parameter increases between the first value 202 and the second value 204, the PIL brightness increases linearly.

The PIL may be located at an HMI of a vehicle, as shown in FIG. 3. Therein, an HMI 300 includes an instrument panel cluster (IPC) 302 displaying various gauges, alerts, and indicators. A PIL 304 may be displayed at the IPC 302 that is illuminated with an intensity according to a long term adaptive knock parameter value, as described above. In this way, an operator may quickly determine a status of an engine, e.g., how much relative torque the engine is able to provide, which may allow the operator to decide if the engine status is suitable for certain power-dependent operations, such as towing a load, accelerating uphill, etc. Furthermore, when a decrease in engine power becomes apparent during a drive cycle, the operator may assess whether the loss of power is due to spark timing, e.g., as indicated when the PIL 304 is not illuminated, or due to other conditions. As such, the PIL 304 provides engine information to the operator which is otherwise undisclosed to the operator in conventional systems.

For example, in instances where the spark timing is advance due in an increase in ambient humidity and engine power output is increased, the long term adaptive knock parameter value may be greater than 0. The PIL 304 may be illuminated when the long term adaptive knock parameter value is greater than 0, thereby notifying the operator the engine is able to produce additional torque, e.g., the engine can produce peak torque. As a result, the operator may conclude that the change in engine torque is due to a different condition. The long term adaptive knock parameter may be affected by noise factors such as humidity, purge vapor, and errors in predictive algorithms used. However, regardless of a root cause, the parameter may advance spark timing and increase engine load as well as retard spark timing and decrease engine load when demanded.

It will be appreciated that the PIL 304 depicted in FIG. 3 is a non-limiting example of how the engine performance may be indicated to the operator. Other examples may include presenting the engine performance status as a text message at the HMI, as a bar increasing/decreasing in height as engine performance varies, or some other type of representative imaging when the HMI includes a display screen. In yet other examples, the indicator may include an audio notification using a vehicle speaker system and/or the vehicle controller may be wirelessly linked to a mobile device where engine performance may also be indicated via a visual and/or audio alert.

An indication of engine performance may be displayed at a vehicle HMI based upon communication between a PCM, an IPC module of the HMI, and an operator. An example of a communication architecture 400 enabling generation of a PIL, e.g., the PIL 304 shown in FIG. 3, is illustrated in FIG. 4. A value for a long term adaptive knock parameter may be determined at the PCM at 402, based on data such as a knock signal from a knock sensor, a SA signal sent to a spark plug, a PIP signal from a Hall effect sensor, etc. The value may be relayed over a communication link 404, which may, in one example, be a controller area network (CAN) bus. The value may be converted into a display signal and sent to the IPC module at 406 through the CAN bus. At the IPC module, the PIL is converted to a visual display at the HMI at 408 with an intensity determined by the long term adaptive knock parameter value. The display is thereby presented to be viewed by an operator at 410.

An example of a routine 500 for providing an indication of engine performance (e.g., available torque output relative to a maximum torque output of an engine) to an operator is shown in FIG. 5. The engine may be the engine 10 of FIG. 1, including one or more knock sensors, such as the knock sensor 137 shown in FIG. 1, coupled to each cylinder of the engine. Output from the one or more knock sensor may be monitored by adaptive knock control and used to continuously provide correction factors for an ignition map. In some examples, each cylinder of the engine may have an independent ignition map. Routine 500 may be implemented in a vehicle adapted with an HMI, such as the HMI 300 depicted in FIG. 3, which includes an IPC. The IPC has a suite of gauges and indicators, including a PIL to indicate a current status of engine performance as determined based on an ignition timing at the cylinders. Instructions for carrying out routine 500 may be executed by a PCM of a controller, such as controller 12 of FIG. 1, based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 502, the routine includes estimating and/or measuring current engine operating conditions. For example, engine speed may be determined based on a signal from a Hall effect sensor, such as the Hall effect sensor 120 of FIG. 1, engine load may be inferred from a MAF sensor, such as the MAF 122 of FIG. 1, knock may be monitored at each cylinder by one of the knock sensors, boost estimated based on a signal from a MAP sensor, such as the MAP sensor 124 of FIG. 1, etc.

Routine 500 includes determining if an ignition or spark timing deviates from a nominal timing at 504. For example, the nominal spark timing may initially be a manufacturer-determined crankshaft angle at which knock is deemed to be mitigated when an optimal fuel type, e.g., a high octane fuel, is combusted at a specific engine load and/or engine speed under nominal ambient conditions, such as temperature and humidity. The nominal ambient conditions may represent moderate ambient conditions. The relationship between spark timing, including the nominal spark timing, engine load and engine speed may be provided in the ignition map.

The spark timing may deviate from the nominal spark timing, e.g., becoming advanced or retarded, when operating conditions change and cause variations in combustion at the engine cylinders. For example, if ambient humidity increases, ignition may be delayed. Spark timing may also be adjusted due to changes in spark plug condition, fuel octane content, boost pressure, cylinder compression ratio, etc. Advancement or delay in spark timing may therefore be adjusted based on signals provided by the engine sensors. As an example, the controller may send instructions to a spark plug of the engine, e.g., the spark plug 192 of FIG. 1, to retard ignition upon receiving data from a humidity sensor in an intake system of the engine indicating that ambient humidity has decreased.

If the spark timing is not nominal, the routine continues to 506 to evaluate if the deviation from nominal spark timing is due to onset of knock at one or more of the cylinders. Onset of knock may be detected based on a knock output signal reaching a threshold output level. If the deviation is determined to be due to the knock output signal reaching the threshold output level, the routine continues to 508 to update a long term adaptive knock parameter value of the adaptive knock control based on the adjusted (e.g., retarded) spark timing.

The long term knock parameter may be a correction used in adaptive knock control to account for changes in combustion conditions leading to knock. When changes to combustion induce the onset of knock, the spark timing is delayed incrementally until knock ceases. A correction may be determined and stored in a correction characteristic map that is correlated to the ignition map. In some examples, the ignition map for each cylinder may be independently corrected. The long term adaptive knock parameter may represent a magnitude of a distance between the knock-induced spark delay and the nominal spark timing for a specific engine speed and load. For example, a difference in angle between the current spark timing and the nominal spark timing may be converted to a value between −1 and 1 based on the amount of deviation and a direction of deviation. When the spark timing is delayed with respect to the nominal spark timing, e.g., in response to combustion of a fuel with a low AKI and a decrease in an engine load limit, the value falls between −1 and 0. When the current spark timing is advanced relative to the nominal spark timing, e.g., due to combustion of high AKI fuel and detection of an increase in the engine load limit, the value falls between 0 and 1. The long term adaptive knock parameter may be stored in the correction characteristic map, along with the corresponding engine operating conditions, and used in future events to adjust the spark timing when the same engine operating conditions are detected.

At 510, the routine includes comparing the value to a threshold value. For example, as shown in FIG. 2, the threshold value may be a value of the long term adaptive knock parameter that is greater than 0 and less than 1. When the value is at or above the threshold value, the PIL may be illuminated with an intensity or brightness proportional to a magnitude of the value. As an example, if the threshold value is 0.25 and the value is determined to be 0.5, the PIL may be illuminated to 25% of a maximum brightness of the PIL. If the threshold value is, instead, 0.75, the PIL may be illuminated to 50% of the maximum brightness.

If, upon comparison, the calculated value is less than the threshold value, the routine proceeds to 512 to continue current engine operation without illuminating the PIL. The operator is therefore made aware that the engine is operating at reduced torque. If, however, the calculated value is equal to or greater than the threshold value, the routine continues to 514 to illuminate the PIL with a brightness corresponding to an amount by which the value exceeds the threshold. As such, the operator is able to quickly view the PIL and determine that the spark timing is not delayed due to detection of knock. Furthermore, based on the brightness of the PIL, the operator may be alerted of how close engine operation is to peak power.

Returning to 504, if the spark timing does not deviate from the nominal spark timing, according to the ignition map, the routine proceeds to 516 to use a current long term adaptive knock parameter value. The current long term adaptive knock parameter value may be based on a previous detection of knock at one or more of the cylinders. The current long term adaptive knock parameter value is then compared to the threshold value at 510. Similarly, at 506, if the deviation from the nominal spark timing is not due to onset of knock, the routine also proceeds to 516 to use the current long term adaptive knock parameter value.

Examples of engine operations and parameters leading to activation/deactivation of a PIL is shown in FIG. 6 at graph 600. Graph 600 depicts an output at a knock sensor at plot 602, spark timing at plot 604, an adaptive knock control parameter (e.g., AKCP) value at plot 606, and a brightness of a PIL at plot 608. The horizontal axis represents time, with time increasing from left to right. For plot 602, the knock sensor output increases along the y-axis and includes a knock threshold 610, above which knock is occurring at a cylinder to which the knock sensor is coupled. Plot 604 shows a nominal spark timing ("nom") represented by dashed line 612 and the vertical axis represents an amount of spark advance ("adv") from the nominal spark timing increasing upwards from the dashed line 612 and an amount of spark retard ("ret") from the nominal spark timing increasing downwards from the dashed line 612. The y-axis at plot 606 represents the range of AKCP values between −1 and 1 and the y-axis at plot 608 represents a percent brightness of the PIL, between 0-100%. A threshold value 614 of the AKCP value is shown relative to plot 606 which may be as the threshold value described at 506 of FIG. 5, above which the PIL is activated.

Prior to t1, the knock sensor output (plot 602) is below the knock threshold 610. As the engine is operated, the knock sensor measures engine vibrations and produces the corresponding output, which is received by a controller, such as the controller 12 of FIG. 1. The measured engine vibrations due to nominal engine operation (e.g., abnormal combustion is not occurring) are small relative to vibrations produced by engine knock. The spark timing (plot 604) is nominal between t0 and t1. Although the nominal spark timing is shown as a flat line, it should be understood that the nominal spark timing varies based on engine operating conditions, including engine speed and load. The AKCP value (plot 606) is at 0, corresponding to the nominal spark timing, and the PIL is not illuminated.

At t1, the knock sensor output reaches the knock threshold 610. In response to the detection of knock, the spark timing is retarded. The spark timing is delayed in small increments until knock ceases at t2. As the spark timing is retarded stepwise, the AKCP value decreases in increments between t1 and t2. The PIL remains deactivated.

Once knock is mitigated, the spark timing is incrementally increased between t2 and t3 until the timing becomes advanced relative to the nominal spark timing at t3. The knock sensor output remains below the knock threshold 610. The AKCP value increases to a value above 0 when the timing spark timing becomes advanced. Furthermore, the AKCP reaches or surpasses the threshold value 614. The PIL is illuminated at t3 to a brightness corresponding to the AKCP value.

In this way, a driver may be alerted to an engine status in real-time during vehicle operation. By implementing an indicator of available engine power at an HMI of the vehicle, the driver may be able to opportunistically utilize the vehicle for operations demanding relatively high torque. The indicator of available engine power may be a PIL which is displayed with variable brightness. An intensity of the PIL illumination may represent a long term adaptive knock parameter determined based on adaptive knock control. As a result, an indication of how much power is being output by the engine is provided to the driver as well as when the engine is operating at peak power. Furthermore, by observing the PIL subsequent to a refueling event, the driver may be able to determine if the loss of power is a result of onset of cylinder knock or due to other combustion conditions. As an example, the driver may observe that engine output is poor subsequent to refueling with a particular type of fuel. Increased control over cylinder knock may therefore be enabled.

The technical effect of implementing an adaptive knock control-based PIL in the vehicle is that a visual indication of ignition timing at the engine is provided.

In another representation, a human-machine interface (HMI) of a vehicle comprising an instrument panel control configured to display a plurality of indicators and gauges including a performance indicator lamp (PIL) indicating engine performance based on a brightness of the PIL. In a first example of the HMI, the brightness of the PIL increases when an engine load limit is increased. A second example of the HMI optionally includes the first example, and further includes wherein the PIL is deactivated when the engine load limit is decreased and spark timing is retarded. A third example of the HMI optionally includes one or more of the first and second examples, and further includes wherein the brightness of the PIL increases when a high anti-knock index (AKI) fuel is combusted. A fourth example of the HMI optionally includes one or more of the first through third examples, and further includes wherein the brightness of the PIL decreases when a fuel having a lower AKI than a previously combusted fuel is combusted. A fifth example of the HMI optionally includes one or more of the first through fourth examples, and further includes wherein the PIL is deactivated when knock is detected at one or more cylinders of the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
generating an adaptive knock control parameter, wherein the adaptive knock control parameter is a long term adaptive knock control parameter that is generated via integrating a short term adaptive knock control parameter, wherein the short term adaptive knock control parameter is based on a deviation of spark timing from a nominal spark timing, and wherein the long term adaptive knock control parameter varies between positive values and negative values;
adjusting engine operation in response to the short term adaptive knock control parameter and the long term adaptive knock control parameter; and
adjusting a display to an operator in response to the adaptive knock control parameter only when the adaptive knock control parameter is a positive value to indicate an available engine power.

2. The method of claim 1, wherein the nominal spark timing is a spark timing where engine knock is unlikely to occur, wherein the adjusting of the display includes distinguishing a change in spark timing due to onset of knock from a change in spark timing due to other combustion conditions, and wherein the display is not adjusted in response to the change in spark timing being due to the other combustion conditions.

3. The method of claim 1, wherein, responsive to retarding spark timing at one or more combustion chambers, generating the adaptive knock control parameter includes inferring a value for the adaptive knock control parameter between −1 and 0.

4. The method of claim 3, wherein retarding the spark timing includes detecting knock at the one or more combustion chambers and adjusting the spark timing to mitigate the knock.

5. The method of claim 3, wherein adjusting the display includes not illuminating a performance indicator lamp when the value is between −1 and 0.

6. The method of claim 1, wherein generating the adaptive knock control parameter includes inferring a value for the adaptive knock control parameter between 0 and 1 when spark timing at one or more combustion chambers is advanced.

7. The method of claim 6, wherein adjusting the display includes illuminating a performance indicator lamp when the value is between 0 and 1 and wherein an intensity of the illuminating increases as the value increases.

8. The method of claim 1, wherein generating the adaptive knock control parameter includes estimating an amount of deviation from a nominal spark timing and scaling the amount of deviation to a value between −1 and 1.

9. The method of claim 1, wherein generating the adaptive knock control parameter includes determining an amount of deviation from a nominal spark timing at combustion chambers of an engine during combustion of fuels with varying anti-knock indexes at the engine.

10. A method, comprising:
determining an adaptive knock control parameter value at a powertrain control module of a vehicle based on spark timing, wherein the adaptive knock control parameter is a long term adaptive knock control parameter that is generated via integrating a short term adaptive knock control parameter, wherein the short term adaptive knock control parameter is based on a deviation of spark timing from a nominal spark timing, and wherein the long term adaptive knock control parameter varies between positive and negative values;
sending the adaptive knock control parameter value to an instrument panel control (IPC) module to convert the adaptive knock control parameter value to a gradation of a visual indicator; and
presenting the visual indicator at a human-machine interface to be viewed by an operator, wherein the gradation of the visual indicator is adjusted based only on positive values of the adaptive knock control parameter value.

11. The method of claim 10, wherein determining the adaptive knock control parameter value includes estimating a value between −1 and 1, and wherein a decreasing magnitude of the adaptive knock control parameter value indicates increased spark retard and an increasing magnitude of the adaptive knock control parameter value indicates increased spark advance.

12. The method of claim 10, wherein sending the adaptive knock control parameter value to the IPC module includes transmitting a signal indicating the adaptive knock control parameter value over a controller area network.

13. The method of claim 10, wherein presenting the visual indicator includes illuminating a performance indicator lamp at the IPC module to indicate an available engine torque.

14. The method of claim 13, wherein adjusting the gradation of the visual indicator includes varying a brightness of the performance indicator lamp based on a magnitude of the adaptive knock control parameter value, and wherein the brightness increases as the magnitude of the adaptive knock control parameter value increases.

15. The method of claim 14, wherein varying the brightness of the performance indicator lamp based on the magnitude of the adaptive knock control parameter value includes adjusting the brightness in response to changes in engine load limit and borderline knock.

16. A vehicle, comprising:
- an instrument panel control (IPC) implemented at a human-machine interface of the vehicle;
- a display included at the IPC indicating available engine power; and
- a controller with computer readable instructions stored on non-transitory memory that, when executed, cause the controller to:
  - generate an adaptive knock control parameter value from an ignition timing value, wherein the adaptive knock control parameter value varies between positive and negative values; and
  - adjust a brightness of the display based solely on positive values of the adaptive knock control parameter value to notify an operator when peak power is available.

17. The vehicle of claim 16, wherein the IPC is located at a dashboard of the vehicle and the display indicating the available engine power is a performance indicator lamp, wherein the adaptive knock control parameter is a long term adaptive knock control parameter that is generated via integrating a short term adaptive knock control parameter, and wherein the short term adaptive knock control parameter is based on a deviation of spark timing from a nominal spark timing.

18. The vehicle of claim 16, wherein the adaptive knock control parameter value varies based on an adjustment of the ignition timing in response to combustion of fuels with varying octane levels at the combustion chambers.

19. The vehicle of claim 18, wherein the adaptive knock control parameter value is decreased when a low octane fuel is combusted and increased when a high octane fuel is combusted.

20. The vehicle of claim 16, wherein the adaptive knock control parameter value is a long term adaptive knock control parameter value.

* * * * *